(12) United States Patent
Brottier et al.

(10) Patent No.: US 12,502,069 B2
(45) Date of Patent: Dec. 23, 2025

(54) METHOD FOR MEASURING A TEAR MENISCUS

(71) Applicant: E-SWIN DEVELOPPEMENT, Houdan (FR)

(72) Inventors: Yves-Vincent Brottier, Adainville (FR); Arnaud Obin, Paray-Douaville (FR); Nelson Perrin, Sainte-Mesme (FR)

(73) Assignee: E-SWIN DEVELOPMENT, Houdan (FR)

( * ) Notice: Subject to any disclaimer, the term of this patent is extended or adjusted under 35 U.S.C. 154(b) by 703 days.

(21) Appl. No.: 17/904,329

(22) PCT Filed: Feb. 18, 2021

(86) PCT No.: PCT/FR2021/050285
§ 371 (c)(1),
(2) Date: Aug. 16, 2022

(87) PCT Pub. No.: WO2021/165619
PCT Pub. Date: Aug. 26, 2021

(65) Prior Publication Data
US 2023/0060385 A1 Mar. 2, 2023

(30) Foreign Application Priority Data

Feb. 21, 2020 (FR) ..................................... 2001763

(51) Int. Cl.
*A61B 3/11* (2006.01)
*A61B 3/00* (2006.01)
*A61B 3/10* (2006.01)

(52) U.S. Cl.
CPC .............. *A61B 3/11* (2013.01); *A61B 3/0025* (2013.01); *A61B 3/101* (2013.01)

(58) Field of Classification Search
CPC .......... A61B 3/11; A61B 3/0025; A61B 3/101
(Continued)

(56) References Cited

U.S. PATENT DOCUMENTS 6,299,305 B1 * 10/2001 Miwa ..................... A61B 3/101
351/200
9,078,599 B2 * 7/2015 Yogesan .............. G02B 26/108
(Continued)

FOREIGN PATENT DOCUMENTS

WO 2013166477 11/2013

OTHER PUBLICATIONS

International Search Report; International Application No. PCT/FR2021/050285 dated May 28, 2021.

*Primary Examiner* — Sharrief I Broome
(74) *Attorney, Agent, or Firm* — Perman & Green, LLP

(57) ABSTRACT

A method for measuring a tear meniscus including: instilling fluorescein on the surface of a patient's eye to be examined, illuminating the eye to be examined with blue light and capturing an image of the eye to be examined, the image including non-fluorescent blue zones in the absence of fluorescein and fluorescent green zones in the presence of fluorescein, and in which the image analysis includes: identifying the tear meniscus and measuring its height in pixels, identifying the iris and measuring its outer diameter in pixels, calculating a ratio between an estimated or also measured physical diameter of the iris and its measurement in pixels and calculating the physical height of the tear meniscus based on this ratio.

14 Claims, 6 Drawing Sheets

(58) Field of Classification Search
USPC .......................................................... 351/205
See application file for complete search history.

(56) References Cited

U.S. PATENT DOCUMENTS

2005/0200707 A1* 9/2005 Yogesan .............. A61B 3/0075
348/207.99
2014/0092361 A1* 4/2014 Takii .................... A61B 3/1005
351/205

* cited by examiner

METHOD FOR MEASURING A TEAR MENISCUS

CROSS REFERENCE TO RELATED APPLICATIONS

This application is a National Stage of International Application No. PCT/FR2021/050285, having International Filing Date of 18 Feb. 2021, which designated the United States of America, and which International Application was published under PCT Article 21 (2) as WO Publication No. 2021/165619 A1, which claims priority from the benefit of French Patent Application No. 2001763, filed on 21 Feb. 2020, the disclosures of which are incorporated herein by reference in their entireties. This disclosure is also related to application FR 19 10129 filed on Sep. 13, 2019 in the applicant's name with the INPI (corresponding to U.S. patent application Ser. No. 17/753,718 filed on Mar. 11, 2022) and patent application FR19 10131 filed on Sep. 13, 2019 in the applicant's name with the INPI (corresponding to U.S. patent application Ser. No. 17/753,604 filed on Mar. 9, 2022), the disclosures of which are incorporated herein by reference in their entireties.

BACKGROUND

Field

The disclosure relates to the field of ophthalmological examinations and in particular to the control of eye lubrication, and more particularly to the measurement of the height of the tear meniscus.

Brief Description of Related Developments

The tear meniscus is an accumulation of tear fluid at the interface between the cornea and the lower eyelid.

Observing the tear meniscus is one of the examinations commonly performed by practitioners in the differential diagnosis of dry eye syndrome.

It is particularly advantageous to evaluate the height of this meniscus: it is representative of the total tear volume.

This evaluation is conventionally carried out with white light, using a slit lamp or an image visualization/acquisition system with a camera, lens and lighting, and, conventionally, the meniscus is interpreted visually.

The meniscus is essentially aqueous and transparent.

Under observation with white light, image formation involves the superposition of two effects:
- visualization of the structure present behind the tear meniscus,
- specular reflection of the light source by the air-tear dioptric interface which, by definition, behaves like a mirror and forms a clear line at the meniscus.

The problem is that the tear meniscus forms a concave curved surface between the cornea and the eyelid, which means that the light rays which are reflected off the surface of the meniscus close to the eyelid do not all go toward a lens positioned facing the eye, which makes visualization of certain regions of the meniscus difficult. In fact, specular reflection is only possible when the tangent of the meniscus is oriented so as to reflect light into the pupil of the lens. It is clear that this will be possible only for a small portion of the meniscus. The clear line observed in this case is therefore not representative of the size of the meniscus.

The regions where the structure of the eye is observed through the meniscus are difficult to interpret.

These known solutions therefore do not allow the height of the tear meniscus to be measured in a straightforward manner.

SUMMARY

In view of the prior art, there is proposed a method for measuring a tear meniscus using fluorescein concentrated in the tear meniscus to make it fluorescent, the method comprising the operations of:
  instilling fluorescein on the surface of a patient's eye to be examined,
  illuminating the eye to be examined with blue light and capturing an image of the eye to be examined, said image comprising non-fluorescent blue regions in the absence of fluorescein and fluorescent green regions in the presence of fluorescein,
  and in which the image analysis comprises:
  identifying the tear meniscus and measuring its height in pixels (h),
  identifying the iris and measuring its outer diameter in pixels (d),
  calculating a ratio (R=D/d) of an outer physical diameter (D) of the iris as estimated or else measured in millimeters to its measurement in pixels (d) and calculating the physical height (H=R×h) of the tear meniscus based on this ratio.

This method is advantageous in that it allows fast and reliable measurement of the actual total height of the tear meniscus.

The estimated physical outer diameter of the iris may be a diameter based on an average value associated with the patient's eye type. To do this, tables of values associated with parameters such as eye color, type, etc. may be integrated into software associated with the method. The outer physical diameter of the iris may also be measured elsewhere, and its value entered into calculation software associated with the method.

Identifying the tear meniscus may comprise comparing the green-to-blue ratio of the pixels of the image with a first determined threshold.

A threshold between 0.8 and 1.3 and in particular of the order of 0.95 may be used.

The method may comprise an operation of excluding dark regions which is designed to eliminate those pixels for which the green and/or blue level is lower than a second determined threshold.

This makes it possible to eliminate potential aberrant detections in dark regions such as the green and blue levels tending toward zero and the green/blue ratio becoming indefinite.

In one embodiment, the method comprises segmenting the image identifying the fluorescent regions and more particularly transforming the image into a binary image assigning a first binary level to those pixels which are predominantly blue in color and a second binary level to those pixels which are predominantly green in color or classifying the pixels of the image according to a threshold with respect to a green/blue ratio.

The binary image allows the fluorescent regions to be identified and allows the tear meniscus to be detected.

The method may comprise an algorithm for searching for connected components and eliminating small objects in the transformed image in order to further improve detection of the meniscus.

The method may comprise an algorithm for applying a closure operator to the transformed image so as to eliminate small local defects without moving the outlines of the regions of a given binary level, which makes the next step of calculating the regression polynomial easier.

One particularly advantageous embodiment is the use of an algorithm for calculating regression polynomials, comprising:

detecting and storing vertical segments perpendicular to the general direction of the tear meniscus in each column of the image, said segments comprising a start produced by a transition from the first binary level to the second binary level and comprising an end produced by a transition from said second level to said first level, said vertical segments representing the fluorescent tear meniscus, based on the transitions delimiting the upper portion of the tear meniscus made up of the starts of segments corresponding to the transition from the non-fluorescent region to the fluorescent region, calculating a first regression polynomial delimiting an upper line, based on the transitions delimiting the lower portion of the tear meniscus made up of the ends of segments corresponding to the transition from the fluorescent region to the non-fluorescent region, calculating a second regression polynomial delimiting a lower line.

Calculating the regression polynomial may use the method of least squares.

The method may then comprise calculating the height (h) of the tear meniscus in pixels by calculating the distance between the regression polynomials calculated for each of said first line and second line down the columns of the image between the upper line and the lower line.

According to one embodiment for simplifying the measurement, the method may comprise, after imaging, selecting a region of interest around the lower eyelid of said patient's eye in order to reduce calculation times and reduce detection errors.

Depending on the chosen instillation method, the method may comprise a delay suitable for waiting for resorption via the tear ducts of excess tear fluid comprising said fluorescein between the instillation of the fluorescein and the measurement.

If the fluorescein is instilled as a drop, one to a few minutes is usually sufficient for excess fluid introduced into the eye to be flushed out via the tear ducts.

Another subject is a computer program comprising instructions for implementing the above method when this program is executed by a processor.

An additional subject is a computer-readable non-volatile storage medium on which is stored a program for implementing the above method when this program is executed by a processor.

A further subject is an ophthalmic measuring device suitable for implementing the above method and comprising an ophthalmic measuring apparatus provided with blue light sources arranged around a lens of at least one camera, a computer provided with a user interface and programmed to drive said sources and said at least one camera, and implement the method, said computer and said interface being integrated into the ophthalmic measuring device or being external thereto and connected to the ophthalmic measuring device.

BRIEF DESCRIPTION OF THE DRAWINGS

Other characteristics, details and advantages of the disclosure will become apparent on reading the detailed description that follows, and on analyzing the appended drawings in which.

DETAILED DESCRIPTION

The drawings and the description below contain, for the most part, elements of a determinate nature. They can therefore serve not only for better understanding of the present disclosure but also contribute to the definition thereof, where appropriate.

Figure 1:
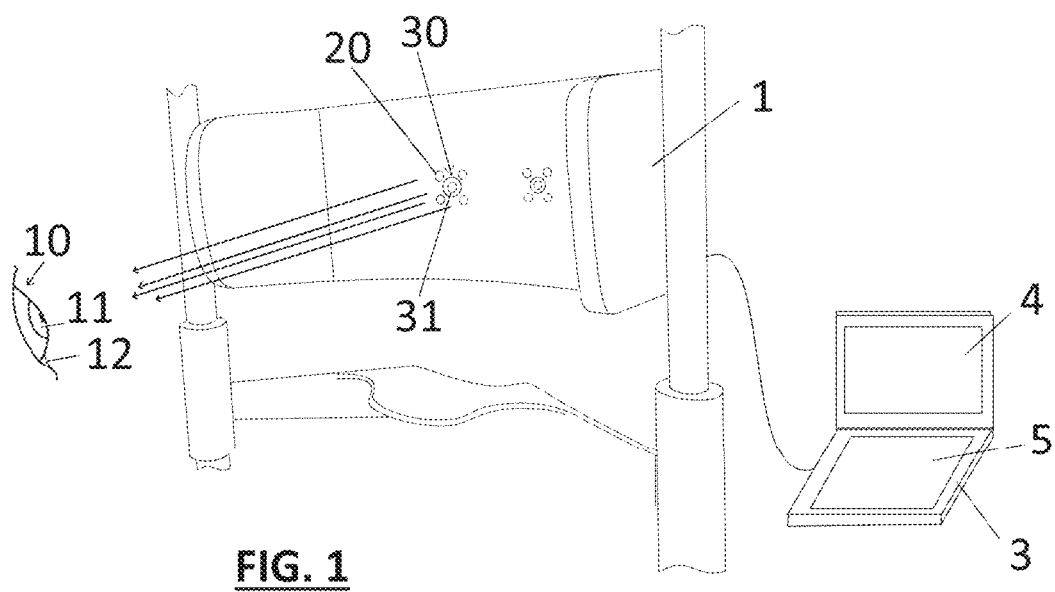
FIG. 1 shows a device suitable for implementing the method according to the description.

Reference is now made to FIG. 1 which shows a device suitable for the method of the disclosure comprising an ophthalmic measuring apparatus 1 provided with one or two cameras whose lens 31 points toward the position of the eyes of the patient positioned in front of the ophthalmic measuring apparatus and provided with sources 20 of blue light at 470 nm in particular.

According to the example, the light sources are four blue light-emitting diodes, hereinafter called blue LEDs, around the lens of each camera.

The device further comprises a computing device such as a computer 3 comprising a screen 4, a keyboard 5, which may also be a touch-sensitive part of the screen, a central processor unit with RAM, ROM and mass storage memory as well as the programs necessary for carrying out the method and an interface suitable for driving the light sources and the cameras.

The computer may be external or directly integrated into the ophthalmic measuring apparatus, for example behind the cameras as described in patent application FR19 10131 filed on Sep. 13, 2019, with the INPI.

Figure 2:
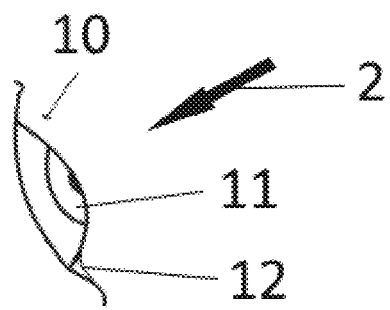
FIG. 2 shows a detail of a step in the method.

The method begins according to FIG. 2 with instillation of fluorescein into the eye or both eyes to be examined.

Fluorescein is conventionally used to detect damaged regions of the bulbar conjunctiva or cornea, to which it binds temporarily. Persistence is quite low and the amount bound by the surface is quite low too.

Fluorescein is miscible with water. Tears are therefore loaded with fluorescein, and this eventually ends up in the tear meniscus, which makes the tear meniscus fluoresce.

Fluorescein may be instilled as a drop and after a delay of a few minutes, the additional liquid volume introduced by the drop of fluorescein is flushed out via the tear ducts. However, enough fluorescein remains to mark the tear volume, which then fluoresces under illumination with the blue light.

Fluorescein may also be instilled by any other means, for example by means of strips, and in this case, there is a priori no excess liquid and the measurement of the method presented above may be performed without delay.

An image of the eye 10 after instillation seen under blue light is then taken by the corresponding camera. Image 100 seen in FIG. 3A comprises the fluorescent tear meniscus 12 which appears green. It further comprises the iris 11, the upper eyelid 13, the lower eyelid 14 and eyelashes 15 which backscatter the incident light and thus appear blue.

Figure 3A:
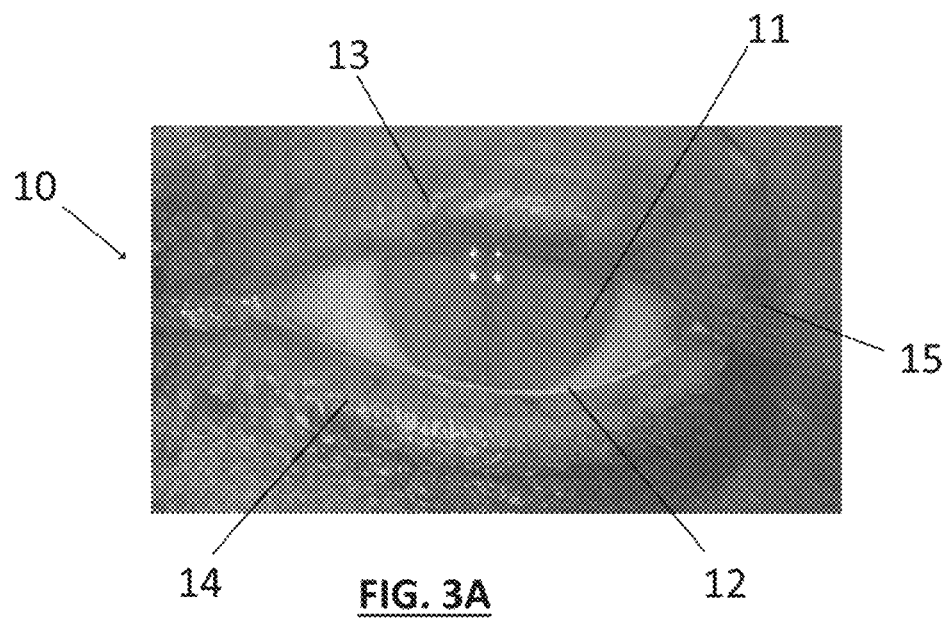
FIG. 3A shows a photo of an eye in the context of the method according to the description.
Figure 3B:
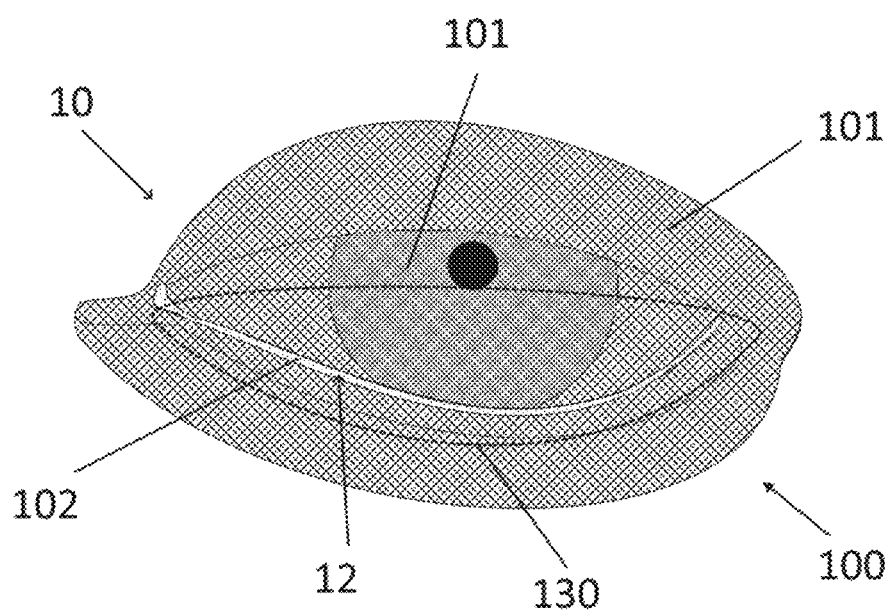
FIG. 3B shows a schematic representation of the photo of FIG. 3A.

According to FIG. 3B which shows image 100 schematically, the blue coloring 101 is schematically represented by a lattice pattern and the fluorescent green 102 by a dashed line. The tear meniscus is thus clearly visible and well defined. The color contrast between the fluorescent green regions and the non-fluorescent blue regions is high.

In an optional step, a region of interest 130 is drawn around the position of the meniscus. To do this, the practitioner roughly circles the region of the tear meniscus on their screen. This avoids performing tear meniscus detection calculations on an aberrant region which might be selected by the software. For example, if there was a lot of fluorescein on the eyelid.

A comparison with a threshold with respect to the green/blue ratio makes it possible to at least partially identify the tear meniscus.

Figure 4A:
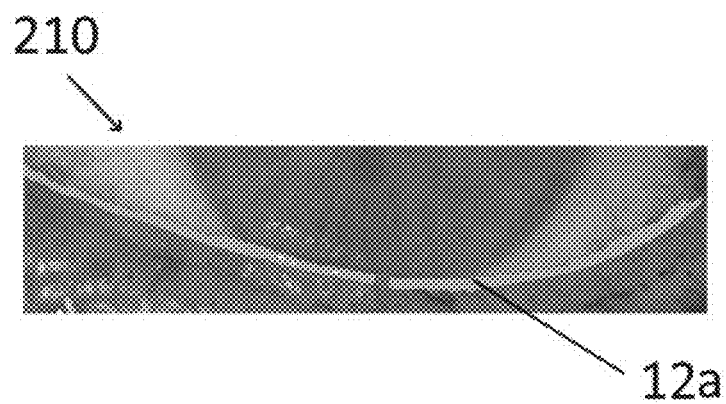
FIG. 4A shows a detail of FIG. 3A after selection.

In the image of FIG. 3A, for a given pixel, the green/blue ratio is very significant. In the absence of fluorescein, the incident blue light is backscattered. The intensity of the green is very low, even zero, and the blue is dominant. The green/blue ratio tends toward 0 and in the presence of fluorescein, as the blue light is absorbed and re-emitted as green. The green/blue ratio is high, or even tends toward infinity in the region of the tear meniscus as shown in FIG. 4A for which the fluorescent region 12a is bright and saturated.

Figure 6:
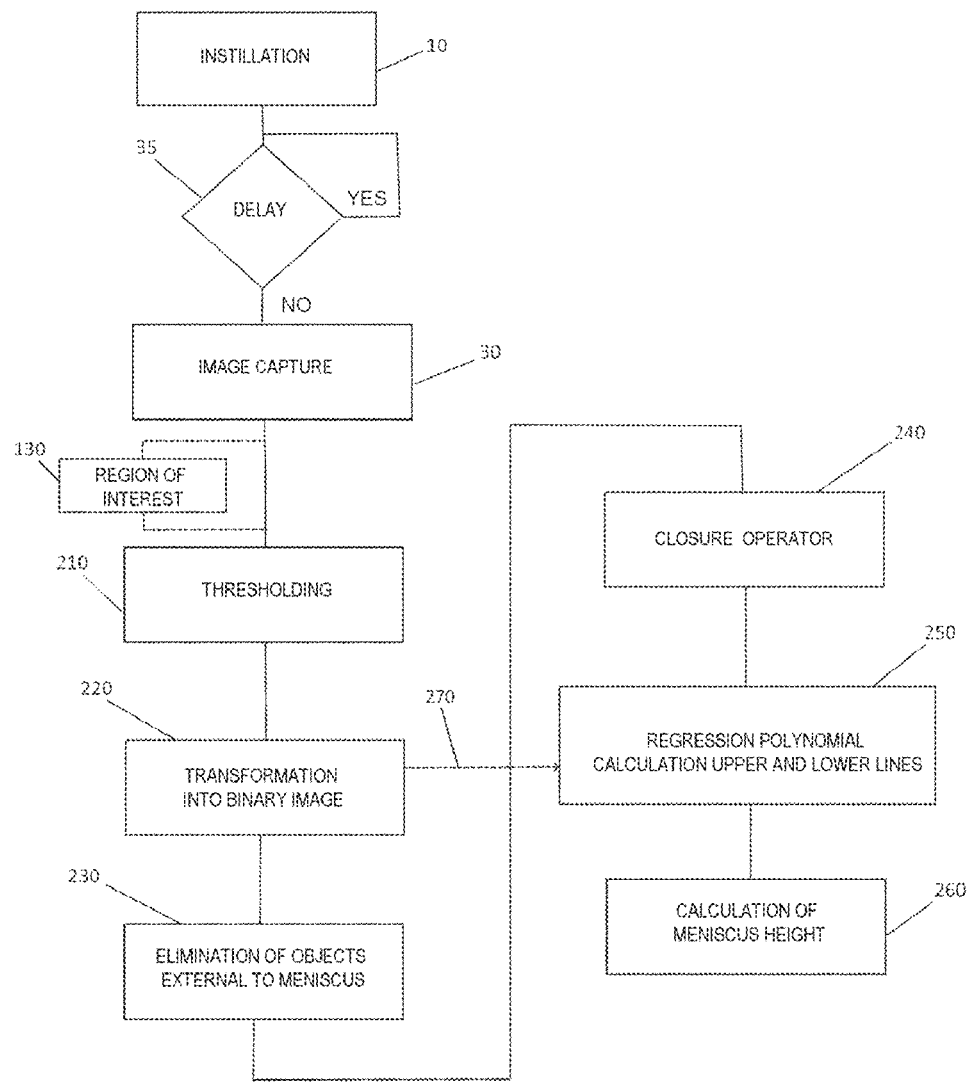
FIG. 6 shows a schematic view of a method according to the description.

The computer program for the method schematically shown in FIG. 6 then comprises an algorithm 220 which will produce a binary image of the region to be considered, and give a binary value 221 to the non-fluorescent portions and a binary value 222 to the fluorescent portions. Two types of thresholds may be used:

Sensitivity: this is the threshold with respect to the green/blue ratio

Excluding dark regions: This threshold allows pixels to be eliminated when the maximum green and blue is lower than the threshold: the green/blue ratio is poorly defined in a very dark image (that is low green and blue level). Typically, on dark skin, anything could be detected on the skin and therefore fluorescence might be detected where there is none.

Threshold values are proposed by default to the operator who may, for example, adapt them to the patient.

Figure 4B:
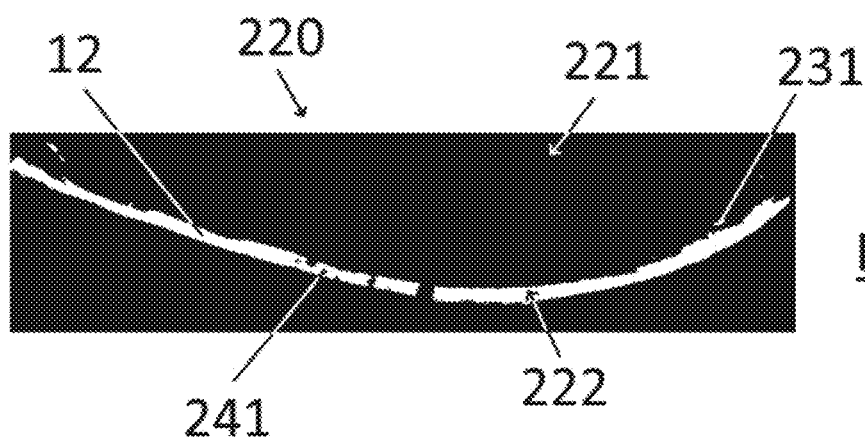
FIG. 4B shows a binary image based on FIG. 4A.

Thus obtained is the binary image of FIG. 4B where the parts in white are the fluorescent regions.

In a next step 230, the method comprises an algorithm for searching for connected components and eliminating small objects 231 external to the meniscus in the transformed image. Small objects are pixels or groups of pixels whose morphology makes it possible to determine that they are not part of the tear meniscus and therefore that they should be excluded from subsequent image analyses. In particular, there may be fluorescent regions which are not part of the tear meniscus, for example on the bulbar conjunctiva or on the eyelids, and this algorithm makes it possible to rule them out because of their morphology (area in pixels, width/height aspect ratio or other characteristics).

Next, the method may comprise a step 240 of applying a closure operator to the binary image, which makes it possible to fill small holes without moving the outlines. For example, this step makes it possible to transform non-fluorescent regions 241 in a fluorescent region of notably larger size into fluorescent regions. This operation is particularly useful if there is dust, a bubble, or any mishap in the fluorescent region of the tear meniscus.

Step 250 comprises calculating regression polynomials on the upper and lower outlines of the tear meniscus.

To do this, based on the preceding binary image, there will be defined vertical segments on each column of the image. By convention, the vertical direction is considered to be the direction perpendicular to a generally horizontal direction of the tear meniscus, or the direction passing through both eyes of the seated patient.

Considering the binary image as a black and white image with white defining the fluorescent region, a vertical segment is defined by:
  its start which is the transition from black to white at the start of the fluorescent region;
  its end which is the transition from white to black at the end of the fluorescent region.

The set of all of the segment starts gives the upper part of the binary image, namely the line of transition from the non-fluorescent region to the fluorescent region. The set of all of the segment ends gives the lower part of the binary image, namely the line of transition from the fluorescent region to the non-fluorescent region.

Figure 4C:
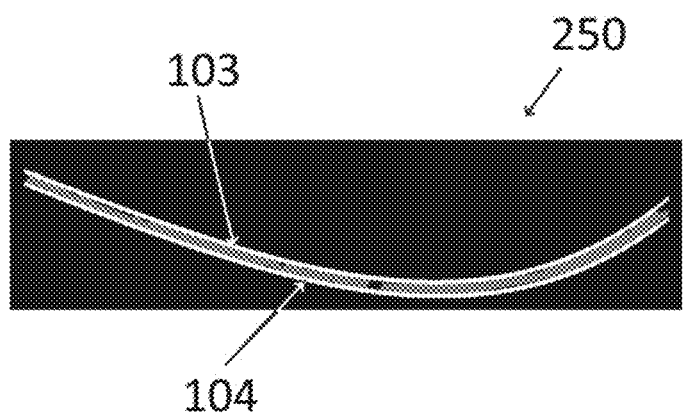
FIG. 4C shows an image of a step of generating regression polynomials.

On each of the upper and lower lines, a regression polynomial is calculated using the method of least squares. This gives the line 103 for the upper polynomial and the line 104 for the lower polynomial in FIG. 4C. Polynomial regression allows sub-pixel resolution and makes it possible to overcome transition position quantification noise and also to overcome local mishaps in the image: noise, dust or excrescence on the eyelid for example. The distance between the top polynomial and the bottom polynomial is in principle natively filtered.

The polynomials are advantageously fourth-degree polynomials so as to follow the curvature of the meniscus.

Figure 5:
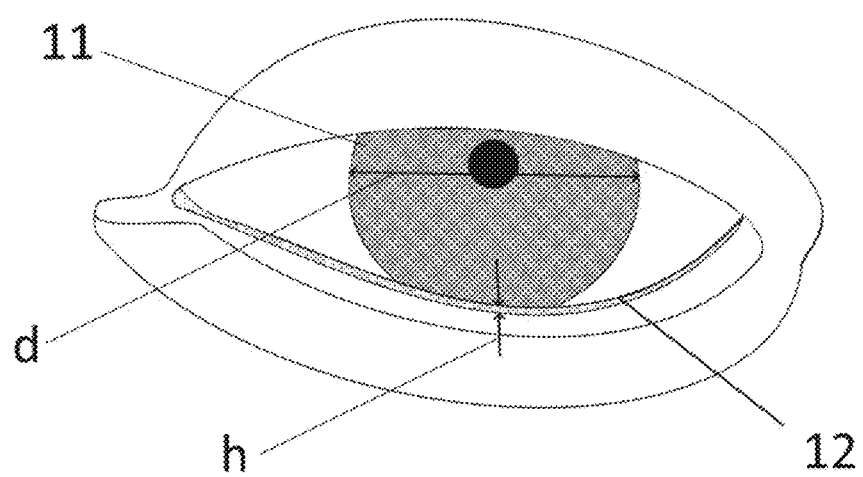
FIG. 5 is a schematic view with the measured data being represented.

Next, in a step 260, the distance between the two polynomials for a given column of the image is calculated to give the height of the tear meniscus in pixels. In FIG. 5, the position for the measurement has been chosen as the vertical passing through the center of the iris, but the practitioner could choose other locations, possibly positioned on their request.

It should be noted that in the case where the image does not comprise objects whose size is smaller than a determined threshold, the steps of eliminating small objects 230 and of applying the closure operator 240 could be omitted so as to go directly from generating the binary image to the step of calculating the regression polynomials as described in FIG. 6 by the dashed line 270.

A second part of the method may comprise automatically detecting the outer diameter of the iris measured in pixels.

Figure 7:
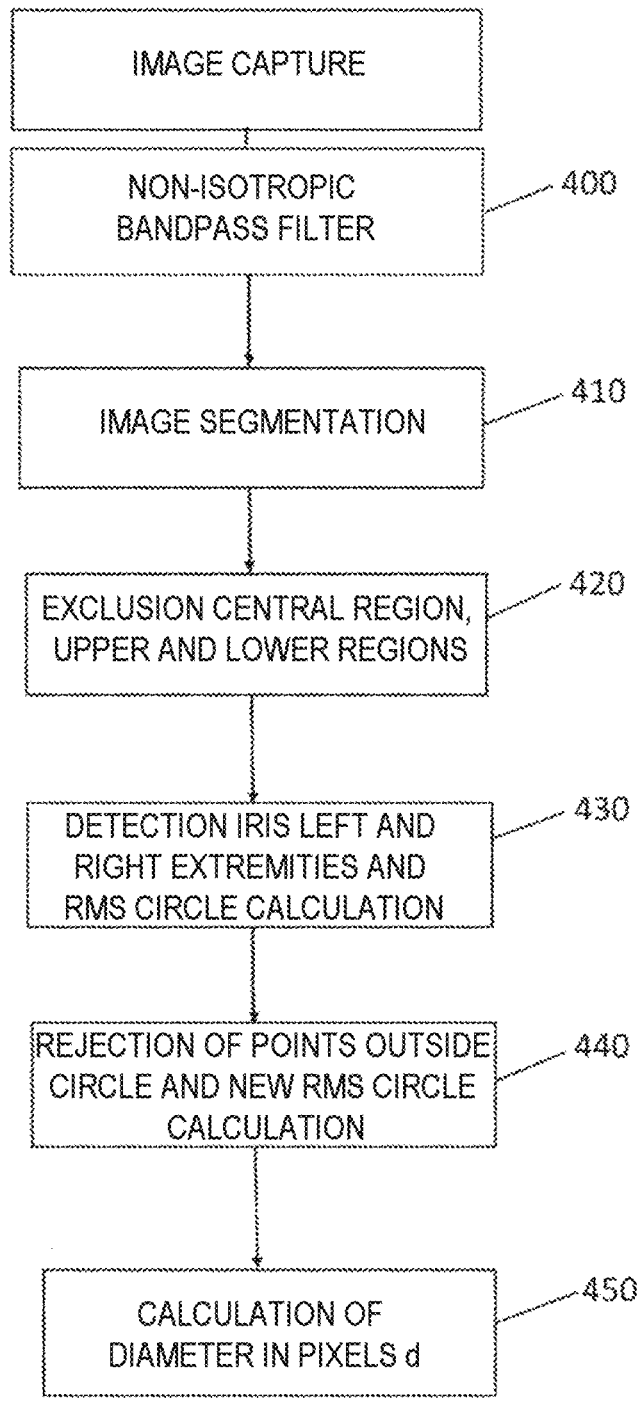
FIG. 7 shows a schematic view of a method for measuring iris outer diameter applicable to the disclosure.

In this case, the method comprises iris detection steps as described in application FR 19 10129 filed on Sep. 13, 2019, in the name of the applicant. The iris detection steps may comprise, according to FIG. 7:
  a first transformation of the image via application of an anisotropic band-pass filter 400 that is applied in the direction of the width of the eye, to produce pairs of rising, dark to light, and falling, light to dark, transitions along a horizontal axis of the eye;
  segmenting 410 the image to find the pairs of rising and falling transitions, which form segments that are necessarily representative of bright regions in the image;
  filtering 420 the image, which removes light segments from the central region comprising the pattern and top and bottom regions of the image;

taking into account light segments, the other regions of the image no longer being considered in this analysis, a first operation 430 of calculating an RMS circle of the perimeter of the iris on the basis of the right ends of the light segments on the left of the image and of the left ends of the light segments on the right of the image;

a step 440 of removing points that are too far from the RMS circle; and with respect to the remaining points, a new step of computing an RMS circle to follow the outline of the iris. Based on the RMS circle, calculating the outer diameter of the iris 450, for example calculating the greatest distance in pixels between the edges of the circle will give the outer diameter d of the iris in pixels which, by knowing the actual outer diameter of the iris, makes it possible to calculate the actual height of the tear meniscus by calculating a ratio R=D/d between the physical diameter D of the iris estimated or measured elsewhere and its measurement in pixels d and calculating the physical height H=Rxh of the tear meniscus from this ratio.

The disclosure is not limited to the examples described above but encompasses any variant that those skilled in the art are able to envision, for example by modifying the order of certain operations, or by removing or adding certain operations for greater calculation speed or precision, within the scope of the claimed protection.

What is claimed is:

1. A method for measuring a tear meniscus using fluorescein concentrated in the tear meniscus to make it fluorescent, based on an analysis of an image obtained by implementing operations of:
    instilling fluorescein on the surface of a patient's eye to be examined,
    providing an illumination source for illuminating the eye to be examined with blue light and illuminating said eye with the blue light,
    characterized in that it comprises:
        providing a camera for capturing an image of the eye to be examined and capturing the image of the eye to be examined, said image comprising non-fluorescent blue regions in the absence of fluorescein and fluorescent green regions in the presence of fluorescein,
        identifying the tear meniscus and measuring its height in pixels,
        identifying the iris and measuring its outer diameter in pixels,
        calculating a ratio of a physical outer diameter of the iris in millimeters to the measured outer diameter in pixels, said physical outer diameter being based on providing an average value corresponding to a type of eye of the patient, or otherwise measuring said physical outer diameter, and calculating the physical height of the tear meniscus based on this ratio.

2. The measuring method as claimed in claim 1, wherein identifying the tear meniscus comprises comparing the green-to-blue ratio of the pixels of the image with a first determined threshold.

3. The measuring method as claimed in claim 2, comprising an operation of excluding dark regions which is designed to eliminate those pixels for which the green and/or blue level is lower than a second determined threshold.

4. The measuring method as claimed in claim 1, comprising transforming the image into a binary image assigning a first binary level to those pixels which are predominantly blue in color and a second binary level to those pixels which are predominantly green in color or classifying the pixels of the image according to a threshold with respect to a green/blue ratio.

5. The measuring method as claimed in claim 4, comprising an algorithm for searching for connected components and eliminating small objects in the transformed image.

6. The measuring method as claimed in claim 4, comprising an algorithm for applying a closure operator to the transformed image so as to eliminate small local defects without moving the outlines of the regions of a given binary level.

7. The measuring method as claimed in claim 4, comprising an algorithm for calculating regression polynomials comprising:
    detecting and storing vertical segments perpendicular to the general direction of the tear meniscus in each column of the image, said segments comprising a start produced by a transition from the first binary level to the second binary level and comprising an end produced by a transition from said second level to said first level, said vertical segments representing the fluorescent tear meniscus,
    based on the transitions delimiting the upper portion of the tear meniscus made up of the starts of segments corresponding to the transition from the non-fluorescent region to the fluorescent region, calculating a first regression polynomial delimiting an upper line,
    based on the transitions delimiting the lower portion of the tear meniscus made up of the ends of segments corresponding to the transition from the fluorescent region to the non-fluorescent region, calculating a second regression polynomial delimiting a lower line.

8. The measuring method as claimed in claim 7, wherein calculating the regression polynomial uses the method of least squares.

9. The measuring method as claimed in claim 7, comprising calculating the height of the tear meniscus in pixels by calculating the distance between the regression polynomials calculated for each of said first line and second line down the columns of the image between the upper line and the lower line.

10. The measuring method as claimed in claim 1, comprising selecting a region of interest around the lower eyelid of said patient's eye in order to reduce calculation times and reduce detection errors.

11. The method as claimed in claim 1, comprising a delay suitable for waiting for resorption via the tear ducts of excess tear fluid comprising said fluorescein between the instillation of the fluorescein and the measurement.

12. A computer program comprising instructions for implementing the method as claimed in claim 1 when this program is executed by a processor.

13. A computer-readable non-volatile storage medium on which is stored a program for implementing the method as claimed in claim 1 when this program is executed by a processor.

14. An ophthalmic measuring device for implementing the method of claim 1, characterized in that it comprises an ophthalmic measuring apparatus provided with blue light sources arranged around a lens of at least one camera, a computer provided with a user interface and programmed to drive said sources and said at least one camera, and implement the method, said computer and said interface being integrated into the ophthalmic measuring device or being external thereto and connected to the ophthalmic measuring device.

\* \* \* \* \*